(12) United States Patent
Ye et al.

(10) Patent No.: US 10,891,127 B2
(45) Date of Patent: Jan. 12, 2021

(54) CONFIGURING DATA COLLECTION

(71) Applicant: BANMA ZHIXING NETWORK (HONGKONG) CO., LIMITED, Kowloon (HK)

(72) Inventors: Jingfu Ye, Shanghai (CN); Zipeng Zhang, Shanghai (CN); Tao Zhang, Shanghai (CN); Xiaoning Wang, Hangzhou (CN)

(73) Assignee: BANMA ZHIXING NETWORK (HONGKONG) CO., LIMITED, Hong Kong (HK)

( * ) Notice: Subject to any disclaimer, the term of this patent is extended or adjusted under 35 U.S.C. 154(b) by 49 days.

(21) Appl. No.: 16/228,402

(22) Filed: Dec. 20, 2018

(65) Prior Publication Data
US 2019/0220273 A1   Jul. 18, 2019

(30) Foreign Application Priority Data

Jan. 2, 2018   (CN) .......................... 2018 1 0002226

(51) Int. Cl.
| | | |
|---|---|---|
| *G06F 9/44* | (2018.01) | |
| *G06F 8/71* | (2018.01) | |
| *G06F 9/54* | (2006.01) | |
| *G06F 16/14* | (2019.01) | |
| *H04W 4/70* | (2018.01) | |
| *G06F 16/9535* | (2019.01) | |

(52) U.S. Cl.
CPC ................ *G06F 8/71* (2013.01); *G06F 9/542* (2013.01); *G06F 16/148* (2019.01); *G06F 16/9535* (2019.01); *H04W 4/70* (2018.02)

(58) Field of Classification Search
CPC .......... G06F 8/71; G06F 9/542; G06F 16/148; G06F 16/1935; G06F 16/9535; H04W 4/70
USPC ........................................................ 717/121
See application file for complete search history.

(56) References Cited

U.S. PATENT DOCUMENTS

| | | | |
|---|---|---|---|
| 9,003,230 B2* | 4/2015 | Kudo .................. | H04L 41/0856 714/26 |
| 9,628,360 B2* | 4/2017 | Nagai ................. | G06F 11/0727 |
| 9,864,810 B2* | 1/2018 | Chumbley ............ | G06F 16/955 |
| 2013/0159244 A1 | 6/2013 | Lavdas | |
| 2014/0222813 A1 | 8/2014 | Yang | |

(Continued)

OTHER PUBLICATIONS

Title: Data collection in wireless sensor networks with mobile elements: A survey author: M Di Francesco, published on 2011.*

(Continued)

*Primary Examiner* — Chameli Das
(74) *Attorney, Agent, or Firm* — Van Pelt, Yi & James LLP

(57) ABSTRACT

Configuration data collection at a device is disclosed, including: detecting, with respect to a device, a data collection event, wherein the data collection event is specified by a configuration file, wherein the configuration file further specifies a set of target data information and a corresponding set of target data information providers from which to collect target data in response to a detection of the data collection event; in response to the detection of the data collection event, collecting the target data based at least in part on the set of target data information and the corresponding set of target data information providers; and controlling the device based at least in part on the collected target data.

16 Claims, 10 Drawing Sheets

(56) References Cited

U.S. PATENT DOCUMENTS

| | | |
|---|---|---|
| 2015/0019553 A1 | 1/2015 | Shaashua |
| 2016/0197798 A1 | 7/2016 | Britt |
| 2017/0039216 A1 | 2/2017 | Fan |
| 2017/0236080 A1* | 8/2017 | Singh .................... G06N 7/005 705/7.28 |
| 2018/0218147 A1* | 8/2018 | Chamberot ............. G06F 21/77 |
| 2019/0266342 A1* | 8/2019 | Kleinpeter .............. H04L 63/08 |

OTHER PUBLICATIONS

Title: Meta-data version and configuration management in multi-vendor environments ; author: JR Friedrich; published on 2005.*

* cited by examiner

CONFIGURING DATA COLLECTION

CROSS REFERENCE TO OTHER APPLICATIONS

This application claims priority to People's Republic of China Patent Application No. 201810002226.3 entitled DATA PROCESSING METHOD, APPARATUS, DEVICE AND MACHINE-READABLE MEDIUM filed Jan. 2, 2018 which is incorporated herein by reference for all purposes.

FIELD OF THE INVENTION

The present application relates to the field of communications technology. In particular, the present application relates to configuring data collection at a device.

BACKGROUND OF THE INVENTION

With the explosive development of mobile Internet technology and the maturing of IoT (Internet of Things) technology, the number of networked devices has grown exponentially, and there is also more variety in applications and services that are provided by the IoT devices. As a result, better data collection is needed to improve the performance of such devices.

In the related art, an application developer may integrate a Software Development Kit (SDK) into an application, call the data collection interface provided by the SDK, and write computer code corresponding to the process of the data collection.

However, the related art requires the developer to understand the actual data needed so that they can correctly use the data collection interface. When there is a change in the data required or if there is an error calling a data collection interface, the developer needs to modify the computer code corresponding to the process of data collection and release a new version of the application that is used to collect data. In fact, each time that an error needs to be corrected, a new version of the application needs to be generated and distributed. As a result, the conventional development and maintenance of an application that is configured to perform data collection for IoT devices is costly and also labor intensive.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described Embodiments of configuring data collection at a device are described herein. A data collection event that is specified in a configuration file is detected with respect to a device. The configuration file further specifies a set of target data information and a corresponding set of target data information providers from which to collect target data in response to a detection of the data collection event. In response to detection of the data collection event, the target data is collected based at least in part on the set of target data information and the corresponding set of target data information providers. The device is controlled based at least in part on the collected target data.

Figure 1:
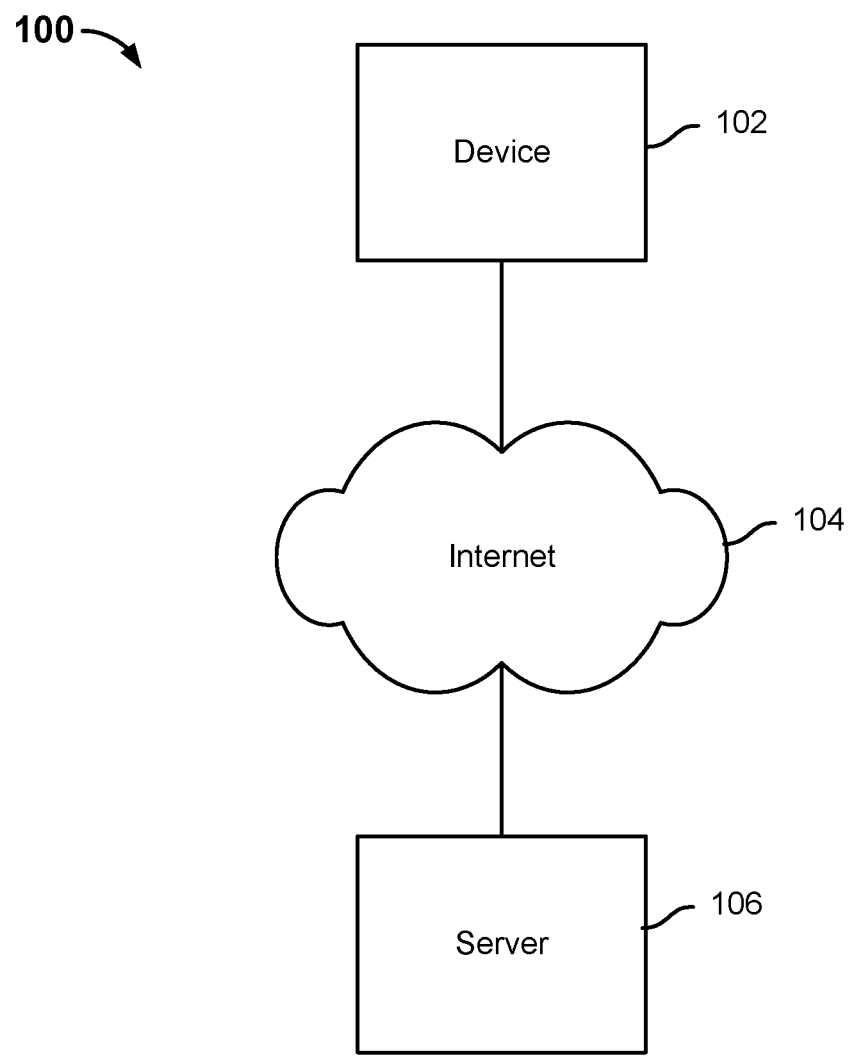
FIG. 1 is a diagram showing an embodiment of a system for configuring data collection at a device.

FIG. 1 is a diagram showing an embodiment of a system for configuring data collection at a device. System 100 includes device 102, network 104, and server 106. Network 104 may comprise high-speed networks and/or telecommunication networks (e.g., a wide area network, a local area network, the internet, or the internet using mobile communication technology).

In various embodiments, device 102 comprises an Internet-of-Things device, which is a device that is configurable to connect to a network (e.g., network 104) and communicate with other devices or servers, such as server 104. Examples of device 102 user equipment described above may include, but are not limited to, smartphones, tablets, e-book readers, MP3 (Moving Picture Experts Group Audio Layer III) players, MP4 (Moving Picture Experts Group Audio Layer IV) players, laptops, vehicle-mounted computers, desktop computers, set-top boxes, smart TVs, and wearable devices.

Internet of Things (IoT) is a network formed by integrating the Internet with information-sensing devices such as RF identification devices, infrared sensors, global positioning systems, and laser scanners. Its objective is to connect all things together with a network to facilitate their identification and management. In the era when everything is connected, the variety of user devices is growing, and the corresponding IoT devices may include devices with screens, devices without screens, home devices, and wearable devices, just to name a few.

In various embodiments, target data is collected in relation to device 102 based on a configuration file that is received at device 102. In some embodiments, the configuration file may be received at device 102 from server 104, directly configured at device 102, and/or uploaded to device 102.

In various embodiments, the configuration file includes one or more data collection events. For each data collection event, the configuration file includes a set of target data information and a corresponding set of target data information providers. A "data collection event" refers to an event that occurs at device 102 that triggers the collection of target data, which is specified by the "set of target data information," from the data source(s) specified by the "corresponding set of target data information providers." For example, a data collection event may occur when a measured value (e.g., as measured by a sensor of device 102) meets, exceeds, or falls below a threshold. In another example, a data collection event may occur when a user action is performed with respect to a widget (e.g., a user selects a soft button that is displayed at an application that is executing at device 102.) In some embodiments, a set of target data information comprises one or more target data item identifiers for which corresponding target data item values are to be collected at device 102. In some embodiments, a target data information provider comprises an application executing at the device, a specific page of the application executing at the device, an input device (e.g., a sensor, a camera, a user interface), and device 102 itself (e.g., a specific module or operating system thereof).

In some embodiments, events that occur at device 102 are monitored (e.g., by an operating system executing at device 102). After a data collection event that is specified by a configuration file is detected at device 102, target data that is prescribed by the configuration file collected at device 102. In some embodiments, the target data is collected at the operating system or another application executing at device 102. The target data may comprise static data (e.g., device data) and/or dynamic data (e.g., data that is measured by a sensor or other input device at device 102). In various embodiments, the collected target data is sent to server 104.

In various embodiments, the collected target data is used to cause device 102 to perform an action. For example, the collected target data is compared against control rules that prescribe an action to be performed by device 102 when a corresponding condition is met.

In some embodiments, the collected target data is sent from device 102 to server 104 and server 104 is configured to determine an action that is to be performed at device 102. Server 104 may send a control instruction to device 102 to cause device 102 to perform the determined action.

The configuration file is extensible and also modifiable. An updated configuration file may be sent to device 102 to cause device 102 to collect different target data and/or from a different data source, which is simpler and less resource-intensive than rewriting the computer code associated with a data collection application and causing the newer version of the data collection application to be downloaded at device 102. Furthermore, the content of a configuration file is extensible, so an existing configuration file may be flexibly expanded as needed to accommodate new data collection scenarios.

Figure 2:
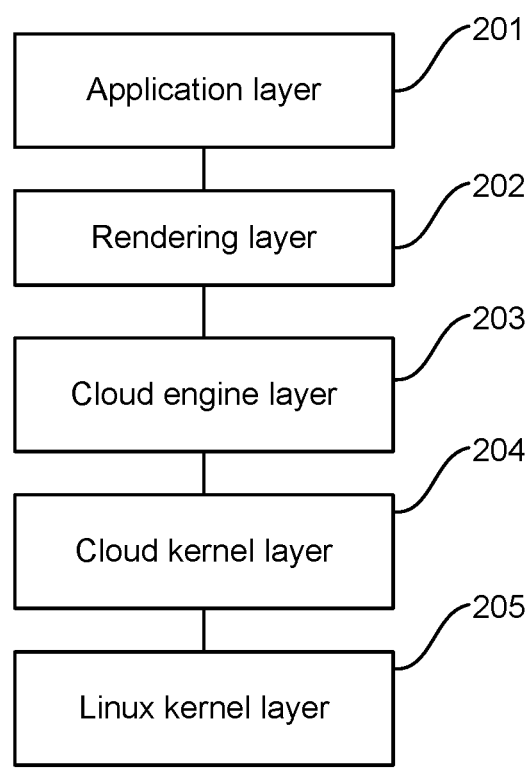
FIG. 2 is a schematic diagram showing one example operating system that is executing at a device.

FIG. 2 is a schematic diagram showing one example operating system that is executing at a device. In some embodiments, the operating system executing at device 102 of FIG. 1 may be implemented using the example of FIG. 2. In the example, operating system 200 includes, from top to bottom: application layer 201, rendering layer 202, cloud engine layer 203, cloud kernel layer 204, and Linux kernel layer 205.

In some embodiments, Linux kernel layer 205 comprises the Linux kernel, which may be a kernel module of the open-source operating system Linux. Specific functions of the operating system in Linux kernel layer 205 may be deeply customized and developed.

In some embodiments, cloud kernel layer 204 comprises a Hardware Abstraction Layer (HAL), system startup management, the system kernel module, and functional modules for graphics, networking, multimedia, sensors, power management, etc.

In some embodiments, cloud engine layer 203 is configured to provide the runtime environment and cloud services. For example, cloud engine layer 203 may be configured to provide the runtime environment and cloud services on the basis of cloud kernel layer 204, including a basic runtime environment for JavaScript applications, page management system, data management system, and resource and page management system for cloud-based services.

In some embodiments, rendering layer 202 is configured to display for an application: Web (World Wide Web) page rendering engine, non-DOM (Document Object Model) page rendering engine, and other third-party rendering engines. In addition, rendering layer 202 is further configured to improve the API, so that by calling the API, the applications of application layer 201 can use the functions of the rendering engine to display pages.

In some embodiments, application layer 201 is configured to support the running and displaying of native applications and third-party applications. Examples of native applications include the cloud card, system UI (User Interface), input method application, desktop and clock, and settings page.

In some embodiments, when an application runs on the operating system in FIG. 2 or a similar operating system at an IoT, at least one step of a process for configuring data collection at the IoT device can be executed by cloud engine 203 of the operating system. Optionally, a service module may be installed on cloud engine 203 to provide data collection service at the operating system level. The service module may provide the collection interface (e.g., application programming interface (API)), which applications may call. In some embodiments, a service module may be installed on the operating system to establish a unified data collection framework at the operating system layer. The service module may be packaged into the operating system installation package for distribution.

Figure 3:
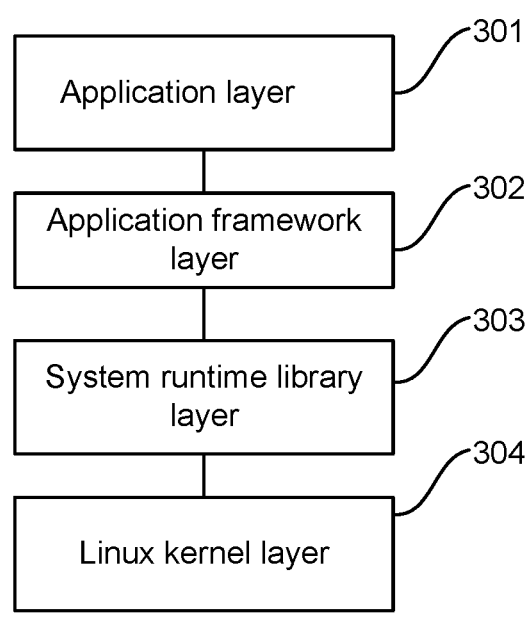
FIG. 3 is a schematic diagram showing another example operating system that is executing at a device.

FIG. 3 is a schematic diagram showing another example operating system that is executing at a device. In some embodiments, the operating system executing at device 102 of FIG. 1 may be implemented using the example of FIG. 3. In the example, operating system 300 includes, from top to bottom, application layer 301, application framework layer 302, system runtime library 303, and Linux kernel layer 304.

In some embodiments, application layer 301 includes an application repository. With JAVA's cross-platform functionality, an application based on Android framework can run on any Android platform without compiling.

In some embodiments, application framework layer 302 is configured to provide an API and simplify component reuse. Any application can publish its function blocks and any other applications can use these function blocks via the API. Such a scheme helps programmers develop programs efficiently. The application reuse mechanism also enables users to easily replace program components.

In some embodiments, system runtime library layer 303 includes a runtime library and the Android runtime. The runtime library supports application framework layer 302 and is also an important connection between application framework layer 302 and Linux kernel layer 304. The Android application is written in JAVA and is executed in the Android runtime. Therefore, in the example of FIG. 3, the Android runtime provides the runtime environment for the application.

In some embodiments, Linux kernel layer 304 functions similarly to Linux kernel layer 205 in FIG. 2.

In some embodiments, when an application runs on the operating system executing at device 102 in FIG. 2 or a similar operating system at a device, at least one step of a process for configuring data collection at the device can be executed by application framework 302 of operating system 300. Optionally, a service module can be installed on application framework 302 of the operating system to provide data collection service at the operating system level. The service module may provide the collection interface which applications may call.

Figure 4:
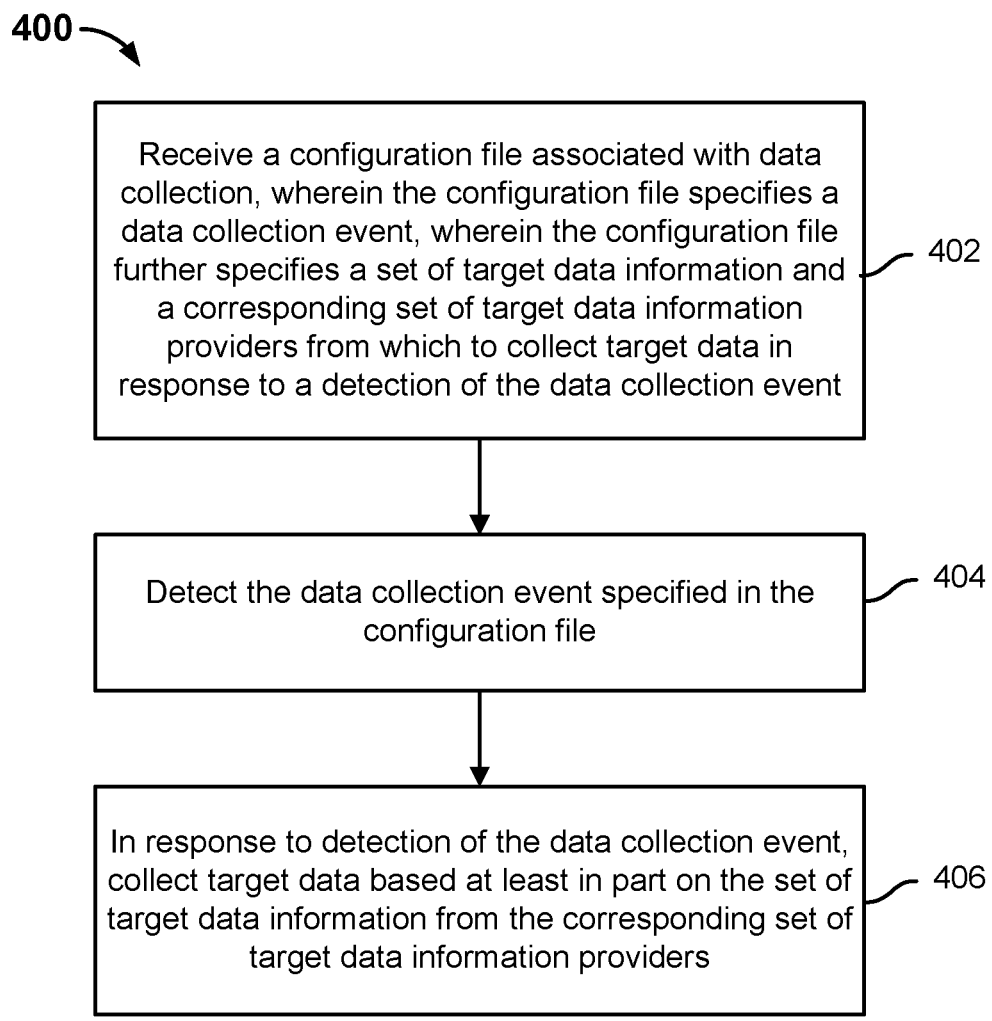
FIG. 4 is a flow diagram showing an embodiment of a process for configuring data collection at a device.

FIG. 4 is a flow diagram showing an embodiment of a process for configuring data collection at a device. In some embodiments, process 400 is implemented at system 100 of FIG. 1. Specifically, in some embodiments, process 400 is implemented at device 102 of FIG. 1.

At 402, a configuration file associated with data collection is received, wherein the configuration file specifies a data collection event, wherein the configuration file further specifies a set of target data information and a corresponding set of target data information providers from which to collect target data in response to a detection of the data collection event.

In some embodiments, a configuration file is received from a server. In some embodiments, a configuration file is directly input at the device.

In various embodiments, a configuration file is configured by a user. In some embodiments, a configuration file is configured by a user at a user interface using predefined configuration file definitions. For example, the configuration file may be configured by a user based on his or her own needs for data collection at a particular device or set of devices. For example, the user may be a device designer who may configure the configuration file to prescribe how the device is to behave in terms of collecting data.

The configuration file may specify one or more data collection events. In various embodiments, a "data collection event" is an event, which once detected, triggers the collection of data in accordance to the target data information and target data information providers that are specified in the configuration file.

At 404, the data collection event specified in the configuration file is detected.

Various events that are occurring at a device may be monitored. In some embodiments, the events may be monitored by a sensor, a camera, a software program, and/or any other monitoring component. In some embodiments, each monitored event is compared to each of one or more data collection events that is described in the configuration file to determine whether a data collection event has occurred. For example, a monitored event may comprise a measured value (e.g., an air quality index that is measured by an air quality sensor) that is compared to a threshold value that is associated with a data collection event.

In some embodiments, a data collection event may be an event that is internal and/or external to the operation of the device. Examples of an external event include an I/O (Input/Output) event. Examples of an internal event include an operation in an application that is executing at the device, e.g., the triggering of a widget on a page of the application or an input event for a piece of information at the application.

In some embodiments, the data collection event may specify a triggering object and/or a triggered object. The object that triggers or causes the data collection event to occur is sometimes called the "triggering object" (or the "triggering subject") and the object to which the data collection event happens is sometimes called the "triggered object." For example, if the data collection event is a click of a widget on a page (e.g., of an application that is executing at the device) or an input of content in a text box by a user, the triggering subject corresponding to the data collection event is the user, and the triggered object corresponding to the data collection event is the widget or the text box. In another example, in an IoT scenario, if the data collection event is the control application for a controller or sensor sending a command to the IoT device or receiving data sent from the IoT device, the triggering object corresponding to the data collection event may be the control application for the controller or sensor and the triggered object corresponding to the data collection event may be the IoT device. Within the scope of an application or operating system executing at the device, the triggering object or the triggered object may be unique, so that by using the identifier of the triggering object or the triggered object, the data collection event in the configuration file can be accurately determined to have occurred. For example, the identifier corresponding to the widget or text box that is specified as a triggering object in the configuration file is unique in an example application so there is no ambiguity in detecting when the corresponding data collection event has occurred.

At 406, in response to detection of the data collection event, target data is collected based at least in part on the set of target data information and the corresponding set of target data information providers.

The configuration file specifies, for each data collection event, a set target data information that is usable to identify the target data to collect. The configuration file also specifies a corresponding set of target data information providers from which to collect such target data. In various embodiments, the corresponding set of target data information providers in the configuration file comprises one or more data item identifiers for which corresponding one or more data item values are to be collected in response to the occurrence of a corresponding data collection event.

In various embodiments, a set of target data information providers in the configuration file comprises identifying information (e.g., identifiers) associated with one or more data sources. Examples of a data source comprise an application executing at the device, a specific page of the application executing at the device, an input device (e.g., a sensor, a camera, a user interface), and the device itself (e.g., a specific module or operating system thereof).

Within the scope of the application or operating system executing at the device, the target data information and the corresponding target data information provider may be unique so that there is no ambiguity in determining what type of data to collect and also where to collect it from in response to a detected corresponding data collection event.

In some embodiments, fields in a configuration file, such as data collection event fields, target data information fields, and target data information provider fields, are extensible. As data collection needs change, the existing fields in the configuration file can be adapted and extended to accommodate new data collection scenarios. For example, the data collection event field in the configuration file can be defined and extended. Therefore, the range of data collection events for which data is to be collected can be updated by simply extending the data collection event field. Or, the target data and target data information provider information fields can be defined and extended to enable the collection of diverse data corresponding to data collection events. Fields other than data collection event, target data, and target data information provider fields of the configuration file may also be added and/or extended in the configuration file.

The configuration file may be implemented using various data formats. Example data formats that can be used to implement a configuration file in accordance to various embodiments include, but are not limited to, JavaScript Object Notation (JSON), Extensible Markup Language (XML), Initialization File (INI), and Yet Another Markup Language (YAML).

Below are two examples of a configuration file in accordance to various embodiments:

Configuration File Example 1

In Example 1, the configuration file may comprise data collection events, target data information, and target data information provider(s). In Example 1, a data collection event corresponds to a triggered object that is a widget that is presented in an application. In this example, the target data information comprises an identifier of a page that includes a target data item identifier for which the corresponding target data item value needs to be collected in response to the occurrence of the data collection event. For example, when a user clicks the "Pay" widget at an application, the target data item values that need to be collected in response to the user clicking of the "Pay" widget may include those corresponding to the target data identifiers associated with the amount, the use, and remarks associated with the transaction that is to be performed.

The following is an example implementation of a configuration file. The following configuration file is implemented using the JSON data format. The embodiments of the present application impose no restrictions on the data formats that are used to implement the configuration file:

```
{
"page" : "page://music.yunos.com/player",
"name" : "play",
"items" : [
[0,"song*", "s"],
[1,"album", "s"],
```

-continued

```
[2,"price", "i"],
[3,"quality", "i"],
]
}
```

The above configuration file describes the following: when the data collection event of a user clicking on the widget named "play" on the page "page://music.yunos.com/player" occurs, the values of the corresponding target data "items" need to be collected. The target data "items" specify values to be collected at the device. Fields of the above target data "item" may specifically include a sequence number field, a name field (a name followed by an asterisk indicates that the field cannot be empty), and a type field ("s" represents a string, and "i" represents an integer value). The values of "song*", "album", "price" and "quality" represent the various target data items to be collected: the name of the song, the name of the album containing the song, the price, and the audio quality of the song, respectively.

In an example application of data collecting based on Configuration File Example 1: in a shopping scenario, the triggered object corresponding to a data collection event is a user action of adding a product into a "shopping cart" widget and the target data information provider is a shopping application. The target data item identifiers may represent the specific product data items to be collected, such as product name, product labels, and product price of the product that was added to the "shopping cart" widget. In this example, the triggered object (the shopping cart widget), which is specified in the configuration file belongs to a shopping application, could be running on the same operating system as the process/program that is collecting the target data.

Configuration File Example 2

In Example 2, the configuration file may comprise data collection events, target data information, and target data information provider(s). In Example 2, a data collection event corresponds to a triggered object that is a device. In this example, the target data information provider comprises an identifier of a device that includes a target data item identifier for which the corresponding target data item value needs to be collected in response to the occurrence of the data collection event.

In an example application of data collecting based on Configuration File Example 2: in an IoT scenario, a triggered object corresponding to a data collection event is an IoT device, where the target data information provider is the IoT device itself or an application that is executing at the IoT device. The target data item identifier may represent specific data items that need to be collected, such as parameters of the IoT device, e.g., the current temperature of a refrigerator, the current air quality index that is measured by an air purifier, etc., when a controller or sensor executes an IoT device-associated data collection event (for example, receiving data sent from the IoT device, sending a command to the IoT device, or displaying data sent from the IoT device). Unlike the example shown for Configuration File Example 1, the triggered object (the IoT device) specified in the configuration file is a physical device, which is likely decoupled from the operating system on which the process/program that is collecting the target data.

In another example application of data collecting based on Configuration File Example 2: a triggering object corresponding to a data collection event is a controller or a control application for a sensor associated with an IoT device, where the target data information provider is the IoT device itself or an application that is executing at the IoT device. The target data item identifier may represent specific data items that need to be collected, such as parameters of the IoT device, e.g., the current temperature of a refrigerator, the current air quality index that is measured by an air purifier, etc., when the controller or the application for the sensor executes an IoT device-associated data collection event (for example, receiving data sent from the IoT device, sending a command to the IoT device, or displaying data sent from the IoT device).

It can be seen that the Configuration File Example 1 and 2 described above are only examples of configuration files in accordance with various embodiments. To adapt to a variety of devices and changes in data collection needs, configuration files can be generated and updated as needed.

In some embodiments, at least one step of process 400 of FIG. 4 is executed by the operating system of a (e.g., IoT) device or an application on a (e.g., IoT) device.

In some embodiments, a service module, which is part of an operating system executing at a device, may further provide a collection interface (e.g., an API). For example, the fields of the collection interface may comprise a target data item identifier field and the corresponding target data item value field. A client (e.g., an application) may obtain the details of the data item identifier field and the corresponding data item value field, and send them to the operating system through the collection interface to assist the operating system in collecting target data. In some embodiments, the service module is a hub that accepts the data from the applications, identifies the target data according to the configuration file, and uploads the target data to a cloud server (e.g., for analysis or for online analyzing). For example, the "service module" is a standby process that runs in the operating system and is a part of the operating system.

In some embodiments, when the process of configuring data collection at a device is executed by an operating system, a unified data collection framework can be established at the operating system level, which reduces the extent to which the data collection affects applications (e.g., executing at the same device). This arrangement also cuts the cost of developing and maintaining the data collection process within the application.

In various embodiments, there are no restrictions on the source of a configuration file. For example, the source of a configuration file is a server, an application, or a device.

In various embodiments, a server, an application, or a device may provide an interface for editing the configuration file. Optionally, the editing interface may comprise an upload interface for receiving the configuration file that is uploaded by the user. In some embodiments, the configuration file may comprise a configuration interface for the user to configure the fields directly in the configuration file. In some embodiments, the configuration interface may comprise a modification interface that enables a user to provide modifications to a previously generated configuration file. Various embodiments do not impose restrictions on how a configuration file can be created or modified. As described herein, a configuration file that instructs how data collection is to be performed with respect to a device is configurable, modifiable, and extensible. Therefore, in various embodiments, changes in data collection need would not affect the manner in which data collection process is performed by a data collection application or require an update to the computer code of such an application. By avoiding the need to rewrite computer code for a relevant application and needing to distribute a newer version of that application, the cost of developing and maintaining the data collection process in an application is reduced.

Moreover, if configuration files are configured and modified on a server, the computation load is reduced on user equipment. Also, configuration files from any user can be obtained through the server so that the range of configuration files that can be used for data collection is expandable.

In some embodiments, a client (e.g., an application or an operating system that is executing at a device) may connect with a server and obtain configuration files from the server. For example, the client may periodically obtain configuration files from the server. In another example, the server may periodically push the newly updated configuration files to the client.

In some embodiments, the target data that is prescribed by a configuration file to be collected in response to a detected data collection event may include, but is not limited to, at least one of the following data types:

1) System data: data that is at the operating system level. For example, system data includes a system model, a version, which CPU, which memory, and other system resource-related data.

2) Dynamic runtime data of objects in the operating system. Objects in the operating system may include: processes and routines corresponding to an application or service. The dynamic runtime data may include, but is not limited to, start time, stop (exit) time, and log data.

3) User behavior data. For example, user behavior may include login data, browse data, and click data pertaining to one or more users. Optionally, user privacy can be protected, and user behavior data can be desensitized. For example, data desensitization is the removal of sensitive information following desensitization rules in order to effectively protect the privacy of the subjects of sensitive data. Data desensitization transforms real data and provides them for testing without violating system rules. Personal information such as national identification number, mobile number, card number, customer number, etc. need to be desensitized, for example. In this way, desensitized real data sets can be safely used in development, testing, and other non-production environments as well as in outsourced environments.

4) Device data. Data corresponding to a device includes static data and dynamic data. Examples of static device data may include device identifiers, such as, specifically International Mobile Equipment Identity (IMEI) and a device serial number. Examples of dynamic data may include the device's location data, the device's network connection data, and the device's Bluetooth connection data.

5) Application data. Application data is data pertaining to what the application does. Examples of applications and the data that they collect include an input method application that collects the user's input behavior data, a search application or a search site that collects the user's search behavior data, or a browser that collects the user's browsing behavior data.

In some embodiments, in a configuration file, a set of target data information includes a target data item identifier (e.g., an attribute) for which a corresponding value, which is sometimes referred to as a target data item value, is to be collected from a corresponding target data information provider that is also specified in the configuration file.

In various embodiments, target data to be collected comprises static data and dynamic data, depending on the features of the data. As such, the following are example data collection schemes corresponding to static target data and also dynamic target data:

Data Collection Scheme 1—Collecting Static Target Data

Data collection scheme 1 is an example process for collecting static target data. Because static target data does not change (e.g., frequently or ever), in some embodiments, mappings between target data item value(s) and the target data item identifier(s) may be established/stored and then used to collect the target item values. As such, one example process for obtaining static target data item values corresponding to static target data item identifiers that are specified for a data collection event in a configuration file includes, after the data collection event is detected, searching for the mappings between the target data item values and those target data item identifiers.

Examples of a mapping between a target data item identifier and a target data item value is a mapping between a product price and the product price value or a mapping between an IoT device parameter and the parameter value. Optionally, the mappings can be stored as key-value pairs, where a key represents a data item identifier and its corresponding value represents the target data item value.

Figure 5:
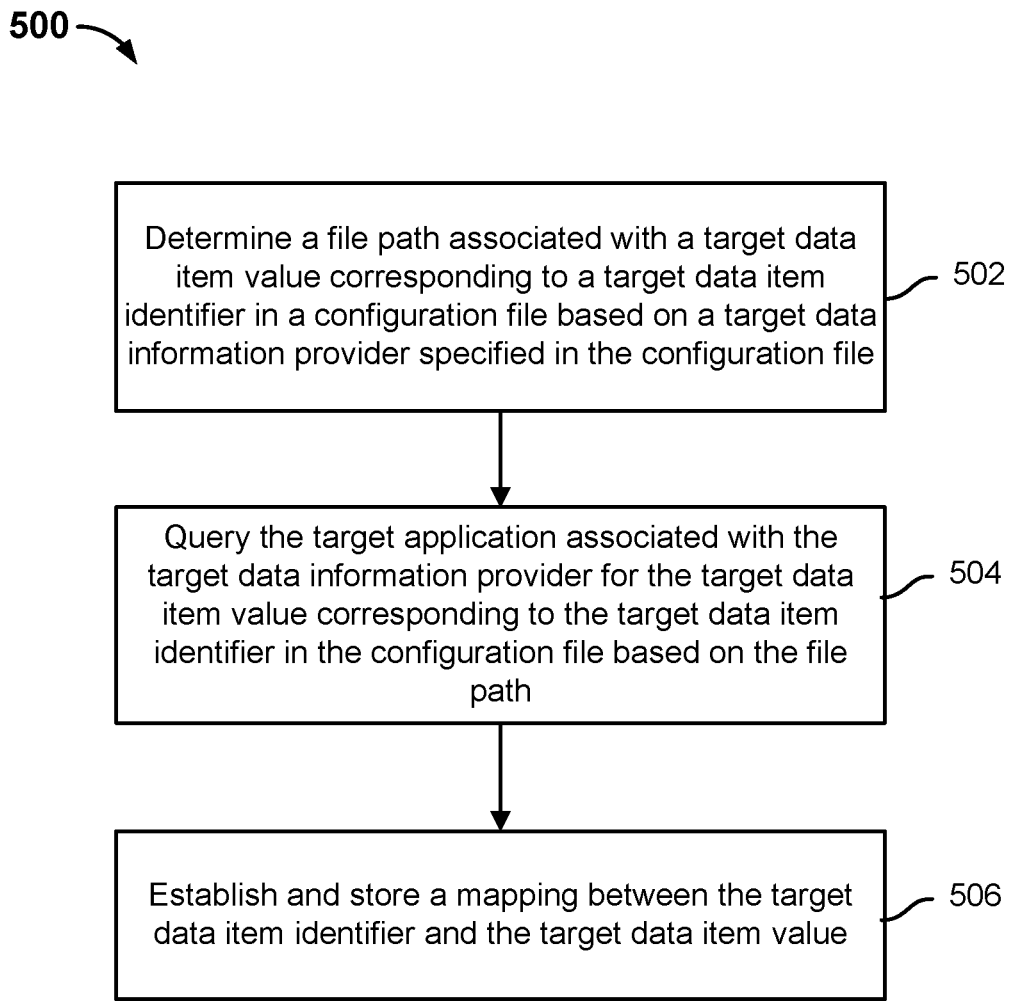
FIG. 5 is a flow diagram showing an example of storing mappings between static target data item identifiers and static target data item values in accordance with data collection scheme 1.

FIG. 5 is a flow diagram showing an example of storing mappings between static target data item identifiers and static target data item values in accordance with data collection scheme 1.

In some embodiments, process 500 is implemented by a process that is executing at a device such as device 102, based on a configuration file.

In some embodiments, if the configuration file includes target data information provider and target data item identifiers, then the mappings between the target data item identifiers and target data item values can be established by identifying a file path corresponding to a target data item value and querying the target application for the target item value using the file path:

At 502, a file path associated with a target data item value corresponding to a target data item identifier in a configuration file is determined based on a target data information provider in the configuration file.

At 504, the target data item value corresponding to the target data item identifier in the configuration file is queried from a target application associated with the target data information provider based on the file path.

At 506, a mapping between the target data item identifier and the target data item value is established and stored. For example, the mappings may be established and stored in accordance to a configuration file and then stored for subsequent target data collection based on that configuration file.

Data that is used to determine the mapping between target data item identifiers and target data item values can be determined from the target data information provider in the configuration file. For example, if the target data information provider is an application, the file path of the target data item value corresponding to the target data item identifier in the configuration file can be determined based on the naming convention (e.g., the name of the application and its current version number, e.g., Tabobao 1.0.1) of the application in the configuration file. In actual practice, an application may disclose its own naming convention so that the other applications or operating systems can determine the file path of the target data item value corresponding to the target data item identifier in the configuration file based on the naming convention. The target data item value corresponding to the target data item identifier in the configuration file can then be obtained via the file path. Of course, an application itself can obtain the file path of the target data item value. In addition, the embodiments described herein impose no restrictions on the specific process for determining the file path of the data item content corresponding to a target data item identifier in the configuration file.

In some embodiments, when target data comprise system data or data corresponding to a device, the mappings between target data item identifiers and target data item values can be established by pre-collecting the system data and the data corresponding to the device.

Data Collection Scheme 2—Collecting Dynamic Target Data

Data collection scheme 2 is an example process for collecting dynamic target data. The example process for collecting dynamic target data is one in which an application that detects a data collection event (that is prescribed in a configuration file) and in response to the detection, collects the target data item values corresponding to the target data items identifiers (that are prescribed in the configuration file), and then sends the collected target data item values to the operating system of the device via a collection interface provided by the operating system.

In this example process of collecting dynamic target data, the operating system is configured to provide the collection interface (e.g., an API) that can be called by an application to submit to the operating system, target data that is prescribed to be collected by a configuration file. For example, the arguments of the API's call/request that is to be made by the application include the target data item identifier (that was prescribed in the configuration file) and the corresponding target data item value (that is collected and/or measured by the application). Where, in such an API call/request, the argument fields of the API request comprising the target data item identifier field and the corresponding target data item value field are provided by the application.

In some embodiments, data can be organized using the industry-recognized JSON format, for example, and the collection interface that is provided by the operating system can be created using JavaScript.

The following is an example API call/request that can be used by an application to send collected dynamic target data to the operating system:

function sendCustomizedData collection event(data collection eventName, data collection eventValue)

In the example API call/request above, the argument fields of the API call/request includes "data collection eventName" and "data collection eventValue." The "data collection eventName" argument field refers to a target data item identifier and "data collection eventValue" may refer to target data item value.

The API can be called as required by an application to send collected and/or measured target data to the operating system. For example, if the application is a shopping application with a target data item identifier of "payment" and target data item value of "details of payment," then the shopping application calls the API using the following format:

sendCustomizedData collection event("payment", {"value": 99, "unit":"RMB", "desc":"buying a t-shirt"})

Where the target data item identifier of "payment" represents data associated with submitting a "payment," and the target data item value of "details of payment" includes the three fields of: "value", "unit" and "desc." "Value" represents the amount of payment, "unit" represents currency unit, e.g., "RMB", and "desc" represents a description of the "details of payment," which is "buying a t-shirt."

It can be seen that, the collection calling process described above is only an example. Various embodiments do not impose restrictions on specific calling process for the collection interface.

As mentioned above, the user of the configuration file and the application developer can have matching data collection needs. Take a shopping scenario as an example: the user of the configuration file can be the store owner, whose data collection needs match that of the shopping application developer, who designed the shopping application to collect data to drive more sales for the store owner. Therefore, the collected target data in the application's call request for the collection interface meets the data collection need of the store's owner.

Data Collection Scheme 3—Collecting Dynamic Target Data

Data collection scheme 3 is another example process for collecting dynamic target data. This example process for collecting target data is one in which the operating system of the device directly queries an application for a target data item value corresponding to a target data item identifier that is prescribed in a configuration file.

Figure 6:
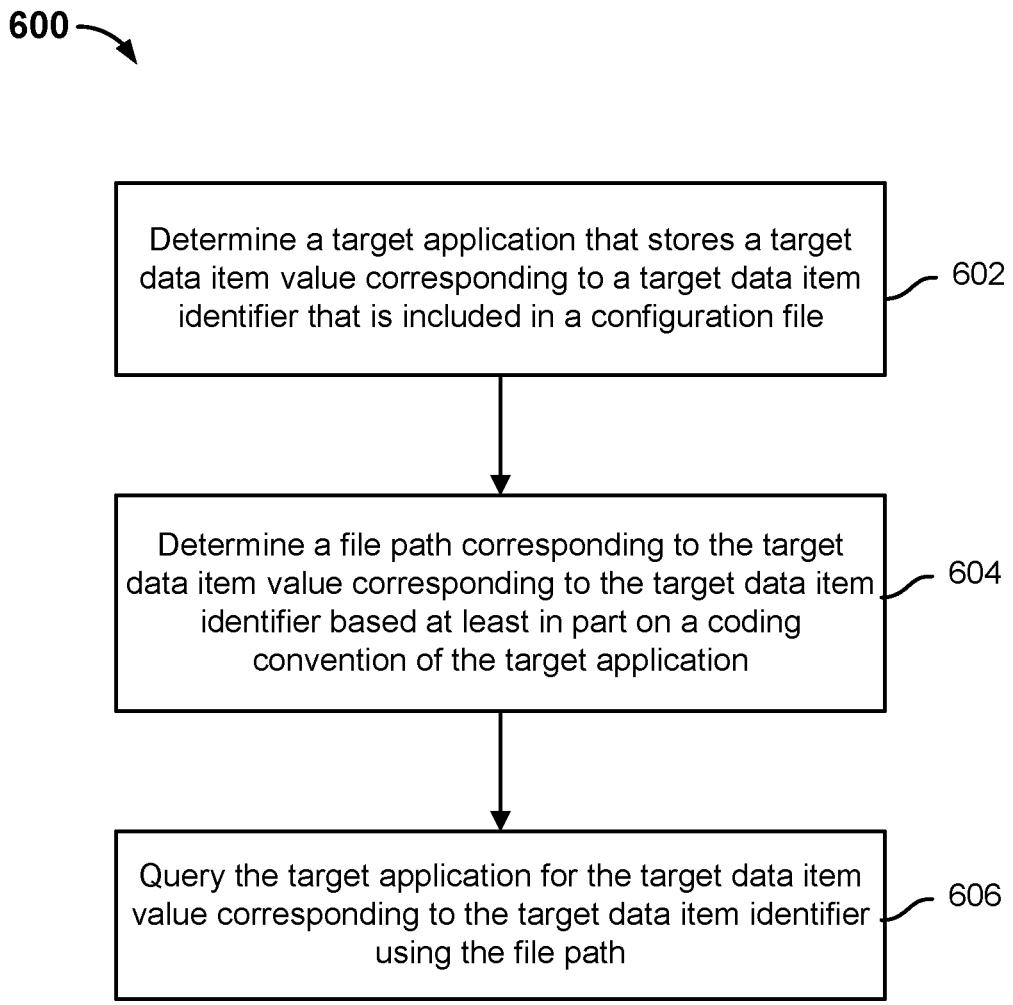
FIG. 6 is a flow diagram showing an example of querying an application for target data in accordance with data collection scheme 3.

FIG. 6 is a flow diagram showing an example of querying an application for target data in accordance with data collection scheme 3. In some embodiments, process 600 is implemented at an operating system that is executing at device 102 of FIG. 1.

At 602, a target application that stores a target data item value corresponding to a target data item identifier that is included in a configuration file is determined. In various embodiments, the target application from which to obtain the target data item value corresponding to a target data item identifier that is prescribed in a configuration file is determined using the target data information provider that is also included in the configuration file.

At 604, based on a naming convention of the target application, a file path corresponding to the target data item value corresponding to the target data item identifier is determined.

At 606, the target application is queried for the target data item value corresponding to the target data item identifier using the file path.

Data collection schemes 1, 2, and 3 described above are only example data collection schemes and in practice, other data collection schemes may be used to obtain the target data item values that correspond to the target data item identifiers that are prescribed in a configuration file.

In various embodiments, the target data to be collected from an IoT device as instructed by the configuration file is used to control the same IoT device or a different IoT device.

In some embodiments, controlling a IoT device includes, for example but is not limited to:

Causing the IoT device to turn on;

Causing the IoT device to turn off; or

Configuring the operating parameters of the IoT device.

In some embodiments, the entity that controls the IoT device based on the target data collected in relation to the IoT device is a controller or a control application corresponding to an IoT device.

In a first example, the IoT device is an air purifier. When the measured current air quality index (the collected target data) exceeds the first threshold, the air purifier is caused to be turned on and the running mode is changed to the first mode. Also, when the measured current air quality index is not above the second threshold, the air purifier is caused to be turned off, where the first threshold is greater than the second threshold.

In a second example, the IoT device is an air conditioner. When the measured room temperature (the collected target data) exceeds the third threshold, the air conditioner is caused to be turned on and set to the cool mode. Also, when the measured room temperature is not above the fourth threshold, the air conditioner is caused to be turned off.

In some embodiments, the collected target data is uploaded to a server (e.g., from which the configuration file was sent) for processing such as data analysis and control.

In some embodiments, the collected target data can be instantly or periodically uploaded to a server. In some embodiments, the collected target data is uploaded to the server when the device's network status meets the first preset condition, which is that the device is able successfully connect to a wired network, WIFI (Wireless Fidelity) or a non-mobile network. In some embodiments, the collected target data is uploaded to the server when the device's network status meets the second preset condition, which is that the device's CPU utilization rate is lower than the first threshold and the device's electrical charge is higher than the second threshold. In some embodiments, the collected target data is packaged before being uploaded. Various embodiments do not impose restrictions on the specific process of uploading the collected target data to the server.

Various embodiments described herein allow target data in relation to a device to be collected based on the contents of a configuration file. When the need for data collection changes, the configuration file can be modified accordingly, which will change the way that target data is collected. Advantageously, changing the configuration file does not affect the manner in which the target data is collected, only what the target data to be collected is. Therefore, changes in data collection needs would not require updating versions (e.g., rewriting the computer code) of the application(s) that are used, at least in part, to collect the target data. As a result, the cost of developing and maintaining the process of data collection by one or more applications can be reduced.

Furthermore, in various embodiments, fields such as data collection event fields and data information fields in the configuration file are extensible. The data format of the fields that are included in the configuration file is also flexible. As such, users can adapt the fields and the data format in the configuration file to various devices and scenarios. For example, a data collection event field can be defined and extended to enable the collection of target data corresponding to any data collection event. Or, a target data information field can be defined and extended to enable the collection of diverse target data. Or, fields other than data collection event or target data information fields in the configuration file can also added. For example, scenario fields can be added to a configuration file to extend the context in which to collect target data.

Figure 7:
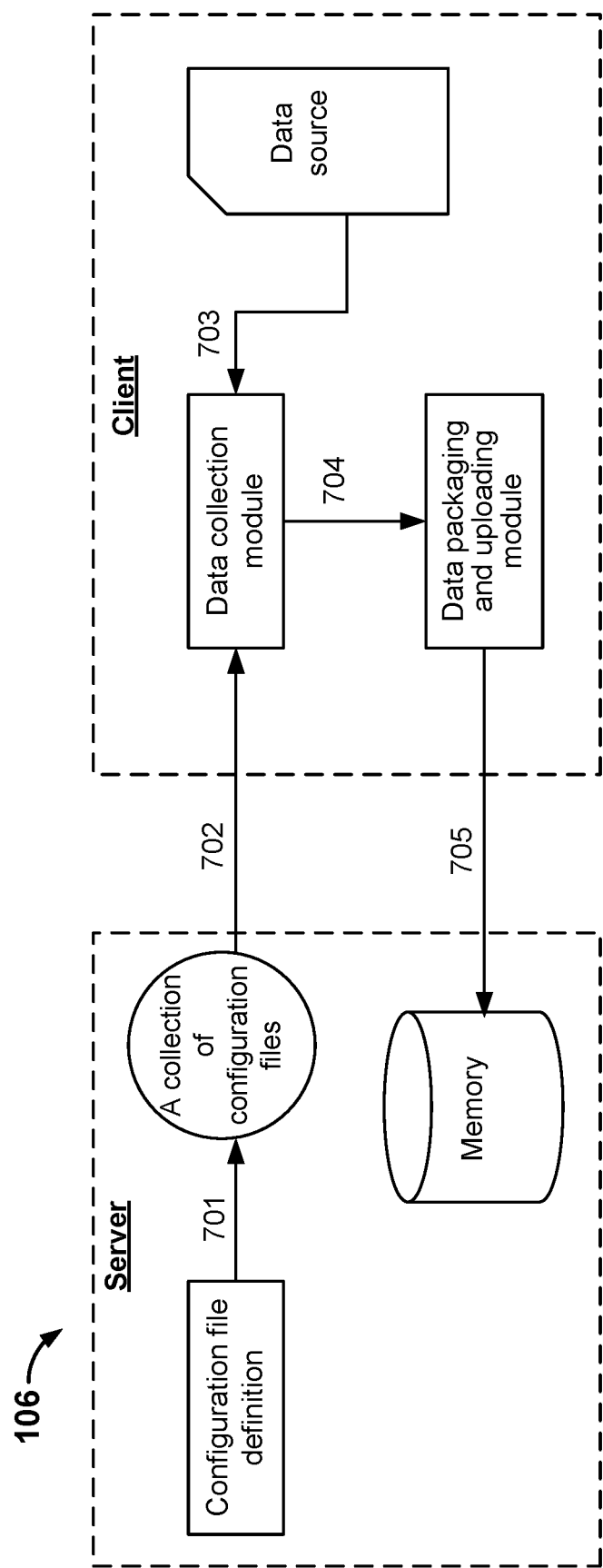
FIG. 7 is a sequence diagram showing an example process of configuring data collection at a device.

FIG. 7 is a sequence diagram showing an example process of configuring data collection at a device. In the example of FIG. 7, the server may be implemented using server 106 of FIG. 1 and the client may be implemented on device 102 of FIG. 1. For example, the client of FIG. 1 includes a data collection module, a data source, and a data packaging and uploading module.

At 701, a configuration file is received at a server.

For example, the server provides a configuration file definition, which can be used by users to configure a configuration file. For example, the server can publish the configuration file definition so that users can configure and modify a configuration file according to the definition at a user interface (not shown) of the server. Alternatively, the server may further receive configuration files that are directly uploaded by the users. As mentioned above, a configuration file includes a data collection event, a set of target data information (e.g., one or more target data item identifiers) to identify target data to collect, and a target data information provider from which to collect the target data. The server stores the configuration file with its collection of configuration files.

At 702, the configuration file is sent from the server to a client.

At 703, events are monitored by a data collection module of the client until a data collection event in the configuration file is detected, and in response to the detection, a target data item value corresponding to a target data item identifier specified in the configuration file is collected.

The data source shown in the client in FIG. 7 corresponds to the data provider that is prescribed in the data provider in the configuration file.

At 704, the target data value is sent by the data collection module to a data packaging and uploading module of the client.

At 705, the target data item value is packaged and uploaded to the server for storage.

In some embodiments, the server can store the collected target data that is uploaded by the client. In some embodiments, the server may provide a view interface for the user to view the target data that is collected based on the configuration file. In some embodiments, the server may analyze the target data collected based on the configuration file with data analysis tools.

Figure 8:
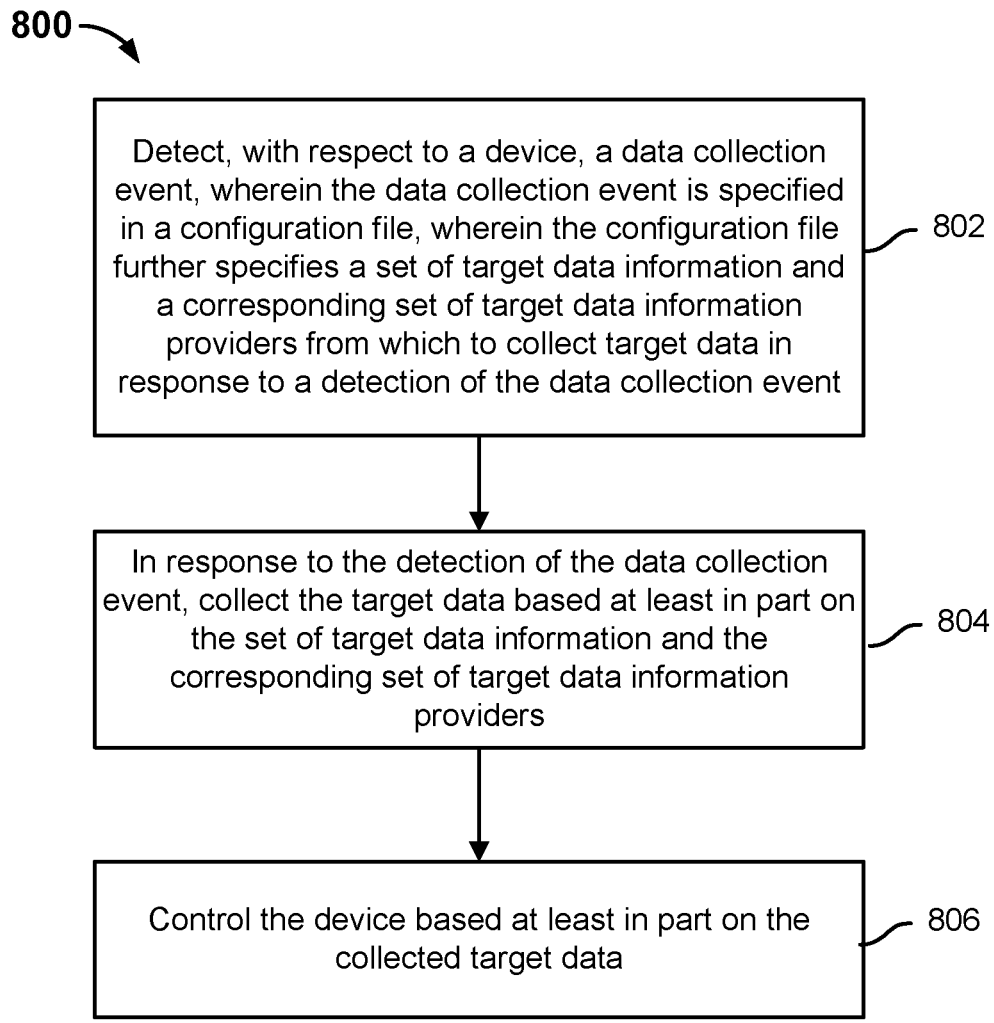
FIG. 8 is a flow diagram showing an embodiment of a process of configuring data collection at a device.

FIG. 8 is a flow diagram showing an embodiment of a process of configuring data collection at a device. In some embodiments, process 800 may be implemented at either device 102 or server 104 of FIG. 1.

At 802, a data collection event is detected with respect to a device, wherein the data collection event is specified in a configuration file, wherein the configuration file further specifies a set of target data information and a corresponding set of target data information providers from which to collect target data in response to a detection of the data collection event.

Step 802 may be implemented similarly to step 404 of process 400 of FIG. 4. In some embodiments, the data collection event is detected in relation (e.g., at or for) an IoT device.

At 804, in response to the detection of the data collection event with respect to the device, target data is collected based at least in part on the set of target data information from the corresponding set of target data information providers.

Step 804 may be implemented similarly to step 406 of process 400 of FIG. 4.

At 806, the device is controlled based at least in part on the collected target data with respect to the device.

In the event that the IoT device executed process 800, the target data can be collected locally at the IoT device and used to control the IoT device to perform an action. In the event that the server executed process 800, the target data could be collected locally at the IoT device and then sent to the server, at which the server determined a control instruction to send to the IoT based on the collected target data. The control instruction includes an identifier associated with the action (e.g., turn on, turn off, change operating parameters, etc.) and/or computer code that the IoT device is to perform/execute.

In some embodiments, the device is controlled based on comparing the collected target data to one or more control rules, where each rule prescribes a control instruction when the collected target data meets a corresponding set of conditions. In some embodiments, the rules are included in the configuration file.

For example, if the collected target data is determined to meet a condition in a control rule, the following can be controlled to occur:

The IoT device is turned on;

The IoT device is turned off; or

The operating parameters of the IoT device are configured.

Example scenarios of various IoT devices that can be controlled and how so using the embodiments include the following: a smart city scenario, a smart home scenario, an Internet of Vehicles scenario, and an industrial IoT scenario. Each example scenario is described below:

In a smart city scenario, the IoT devices may comprise a traffic light and/or a camera and examples of controlling of the IoT devices include the following:

Controlling the traffic light based on status data corresponding to the traffic light; and/or Controlling the camera based on real-time traffic data collected by the camera; and/or Controlling the camera based on real-time traffic data collected by the camera; and/or The status data corresponding to the traffic light may include: on, off, or determine the duration that each traffic signal (e.g., red, yellow, and green) stays on. For example, when the current status data corresponding to the traffic light is off, the traffic light can be controlled to turn on.

Applying embodiments described herein to the smart city scenario, the collection of parameters corresponding to the traffic light can be configured through a server and stored in a configuration file. The configuration file can then be issued to a specific user equipment and/or the IoT device itself for execution. The collection parameters may comprise collection content (what is to be collected) and collection frequency (how often the collection occurs).

The real-time traffic data collected by a camera may refer to the real-time traffic conditions collected by the camera within its range. Examples of controlling the camera device based on the real-time traffic data collected by the camera may comprise: adjusting the position, angle, and operating parameters (e.g., capture mode, with or without flash, exposure parameters) of the camera based on the real-time traffic data collected by the camera.

Based on the real-time traffic data collected by the camera, the traffic light can be also caused to facilitate traffic flow. For example, when traffic is heavy in one direction, the duration of the green light in that direction can be controlled to be extended.

In the smart city scenario, another IoT device may comprise a manhole cover. Controlling of the IoT device based on the data corresponding to the IoT device may include controlling the manhole cover based on the data corresponding to the manhole cover.

Missing manhole covers pose dangers for people. Sensing technology can help monitor the manhole covers in a city. For example, a sensor (e.g., that detects light and/or the proximity of an object) can be installed under a manhole cover. If the cover is missing, the sensor would collect the sensor data associated with a missing manhole and the collected data can be transmitted to the cloud through a monitoring terminal. Therefore, a missing manhole cover can be quickly detected and a relevant action (e.g., the ordering of a replacement manhole cover) can be carried out.

Applying embodiments described herein to an industrial IoT scenario, an example IoT device is an industrial gateway (e.g., router) and the controlling of the IoT device is based on the data corresponding to the IoT device includes controlling the traffic through the industrial gateway based on the traffic data corresponding to the industrial gateway.

For example, traffic spikes can be detected based on the traffic data corresponding to the industrial router. In addition, when a traffic spike is detected, abnormal traffic can be blocked by tracing the cause and restricting the bandwidth from an IP address to the router. For example, there is a traffic spike in a company's router in an early morning. According to the time point of the traffic spike, the IP addresses that caused the spike can be quickly traced and located. Furthermore, it provides bandwidth control at an individual IP-router level of granularity, to restrict the bandwidth from certain IP addresses to the router, block abnormal traffic, and reduce the impact on critical services.

Applying embodiments described herein to an Internet of Vehicles scenario, an IoT device is a vehicle and the controlling of the IoT device is based on the data corresponding to the IoT device includes controlling operating parameters of the vehicle based on the status data corresponding to the vehicle. For example, a vehicle-mounted sensor can sense the surroundings of a vehicle and control the steering and speed of the vehicle to ensure a safe and reliable drive, based on the sensor information about the road, vehicle location, and obstacles on the road.

In summary, various embodiments described herein can be applied to various different IoT scenarios. Specifically, various embodiments described herein can be used to collect data corresponding to IoT devices and based on which, the IoT devices can be controlled to improve their use.

Figure 9:
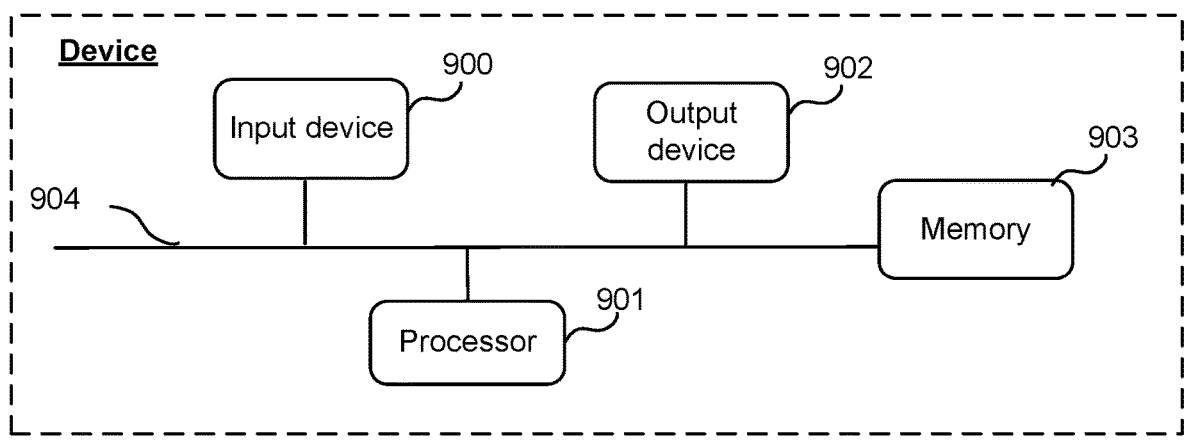
FIG. 9 is a hardware diagram of an embodiment of a device associated with configuring data collection.

FIG. 9 is a hardware diagram of an embodiment of a device associated with configuring data collection. In some embodiments, device 102 of FIG. 1 may be implemented using the example of FIG. 9. As shown in FIG. 9, the device may comprise input device 900, processor 901, output device 902, memory 903, and communication bus 904. Communication bus 904 is configured to implement inter-component communication connections. Memory 903 may include high-speed RAM memory. Memory 903 may also contain non-volatile memory (NVM), such as at least one magnetic disk storage device. Memory 903 may store various programs used to complete various processing functions and to implement the method steps of the present embodiment.

Optionally, processor 901 could be implemented as a central processing unit (CPU), an application-specific integrated circuit (ASIC), a digital signal processor (DSP), a digital signal processing device (DSPD), a programmable logic device (PLD), a field-programmable gate array (FPGA), a controller, a microcontroller, a microprocessor, or another electronic component. Processor 901 is coupled to input device 900 and output device 902 through a wired or wireless connection.

Optionally, input device 900 may comprise multiple input devices. For example, it could comprise at least one of the following: a user-oriented user interface, a device-oriented device interface, a software programmable interface, a camera, and a sensor. Optionally, the device-oriented device interface is a wired interface for conducting device-to-device data transmissions, or it could be a hardware insertion interface (e.g., a USB interface or a serial port) for conducting device-to-device data transmissions. Optionally, the user-oriented user interface could, for example, be user-oriented control keys, a speech input device for receiving speech input, or a touchscreen perceiving device (such as a touchscreen or a touch tablet having touch-sensing functions). Optionally, the programmable interface of the software described above could be a portal, such as a chip input pin interface or output interface, through which the user edits or modifies the program. Optionally, the transceiver described above could be a radio-frequency transceiver chip, a baseband chip, or a transceiver antenna. A microphone or other audio input device can receive speech data. Output device 902 may include a display device, sound equipment, and other output devices.

Figure 10:
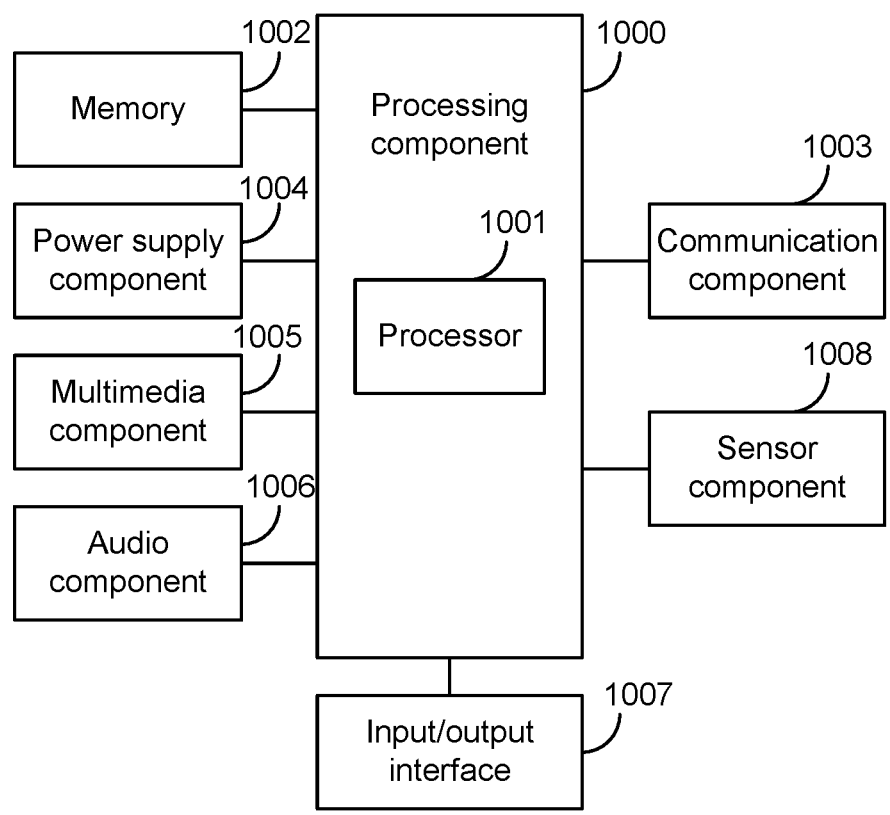
FIG. 10 is a hardware diagram of an embodiment of a device associated with configuring data collection.

FIG. 10 is a hardware diagram of an embodiment of a device associated with configuring data collection. The device of FIG. 9 may be implemented using the example of FIG. 10. As shown in FIG. 10, the device may include processor 1001 and memory 1002.

Processor 1001 executes the computer code stored in memory 1002 and thus implements the processes described in FIGS. 4-8 as described above.

Memory 1002 is configured to store all kinds of data in support of device operations. Examples include the instructions of any application or method, such as messages, pictures, and video, used for operations on the device. Memory 1002 may contain random access memory (RAM) and may also contain non-volatile memory, such as at least one magnetic disk storage device.

Optionally, processor 1001 is set up in processing component 1000. The device may further comprise: communication component 1003, power supply component 1004, multimedia component 1005, audio component 1006, input/output interface 1007, and/or sensor component 1008. The components specifically contained within the device are set according to need.

Processing component 1000 generally controls the overall operations of the device. Processing component 1000 may comprise one or more processors 1001 for executing instructions so as to complete all or some of the steps of the processes described above. In addition, processing component 1000 may comprise one or more modules to facilitate interaction between processing component 1000 and other components. For example, processing component 1000 may comprise a multimedia module to facilitate interaction between multimedia component 1005 and processing component 1000.

Power supply component 1004 provides electric power to the various components of the device. Power supply 1004 can include a power supply management system, one or more power supplies, and other components related to generating, managing, and allocating power to the device.

Multimedia component 1005 comprises an output interface display screen provided between the device and the user. In some embodiments, the display screen may comprise a liquid crystal display (LCD) or a touch panel (TP). If the display screen comprises a touch panel, the display screen is implemented as a touchscreen to receive input signals from the user. The touch panel comprises one or more touch sensors to detect touches, sliding actions, and gestures on the touch panel. The touch sensor can not only detect the boundaries of touch or slide actions, but also can measure duration and pressure related to the touch or slide operations.

Audio component 1006 is configured to output and/or input audio signals. For example, audio component 1006 includes a microphone (MIC). When the device is in an operating mode, e.g., speech recognition mode, the microphone is configured to receive external audio signals. Received audio signals can be further stored in the storage device 1002 or sent by communication component 1003. In some embodiments, audio component 1006 further comprises a speaker for output of audio signals.

Input/output interface 1007 provides an interface between processing component 1000 and peripheral interface modules. The peripheral interface modules include keyboards, click wheels, buttons, etc. These buttons may include but are not limited to: volume button, start button, and lock button.

Sensor component 1008 comprises one or more sensors and is used to provide status evaluations of various aspects of the device. For example, sensor component 1008 can detect the on/off status of the device, the relative position of the component, and the presence or absence of contact between the user and the device. Sensor component 1008 may comprise a proximity sensor that is configured to detect the presence of a nearby object when there is no physical contact, including measurement of distance between the user and the device. In some embodiments, sensor component 1008 may further comprise a camera.

Communication component 1003 is configured to facilitate wired or wireless communication between the device and other devices. The device may access wireless networks based on a communications standard such as Wi-Fi, 2G, 3G, or combinations thereof. In one embodiment, the device may comprise a SIM card slot. The SIM card slot is for inserting a SIM card, which enables the device to register with a GPRS network and establish communication between the Internet and servers.

For example, one or more of communication component 1003, audio component 1006, input/output interface 1007, and sensor component 1008 may be used to implement input device 900 in the FIG. 9.

Each of the embodiments contained in this description is described in a progressive manner. The explanation of each embodiment focuses on areas of difference from the other embodiments, and the descriptions thereof are mutually referenced for portions of each embodiment that are identical or similar.

A person skilled in the art should understand that an embodiment of the present invention may provide methods, apparatus, or computer program products. Therefore, the embodiments of the present invention may take the form of embodiments that are entirely hardware, embodiments that are entirely software, and embodiments that combine hardware and software aspects. Moreover, an embodiment of the present invention may take the form of one or more computer program products implemented on computer-usable storage media (including but not limited to magnetic disk memory, CD-ROM, and optical memory) containing computer-usable program code.

In one typical configuration, the computer device comprises one or more processors (CPUs), input/output interfaces, network interfaces, and memory. Memory may include such forms as volatile memory in computer-readable media, random access memory (RAM) and/or non-volatile memory, such as read-only memory (ROM) or flash memory (flash RAM). Memory is an example of a computer-readable medium. Computer-readable media, including permanent and non-permanent and removable and non-removable media, may achieve information storage by any method or technology. The information is computer-readable instructions, data structures, program modules, or other data. Examples of computer storage media include but are not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digital multifunction disc (DVD) or other optical storage, magnetic cassettes, magnetic tape or magnetic disc storage, or other magnetic storage equipment or any other non-transmission media that can be used to store information that is accessible to devices. As defined in this document, computer-readable media does not include transitory computer-readable media, such as modulated data signals and carrier waves.

The present invention is described with reference to flowcharts and/or block diagrams based on methods, devices (systems), and computer program products of embodiments of the present invention. Please note that each flowchart and/or block diagram within the flowcharts and/or block diagrams and combinations of flowcharts and/or block diagrams within the flowcharts and/or block diagrams can be realized by computer instructions. One can provide these computer instructions to a general-purpose computer, a specialized computer, an embedded processor, or the processor of other programmable data processing devices so as to give rise to a machine, with the result that the instructions executed through the computer or processor of other programmable data processing devices give rise to an apparatus that is used to realize the functions designated by one or more processes in a flowchart and/or one or more blocks in a block diagram.

These computer program instructions can also be stored in computer-readable memory that guides the computer or other programmable data processing device to operate in a specified manner, so that the instructions stored in this computer-readable memory give rise to a product that includes the instruction apparatus, and this instruction apparatus realizes the functions designated in one or more processes in a flowchart and/or one or more of the blocks in a block diagram.

These computer program instructions can also be loaded onto a computer or other programmable data processing devices, with the result that a series of operating steps are executed on a computer or other programmable devices so as to give rise to computer processing. In this way, the instructions executed on a computer or other programmable devices provide steps for realizing the functions designated by one or more processes in a flowchart and/or one or more blocks in a block diagram.

Although preferred embodiments of the present invention have already been described, persons skilled in the art can make other modifications or revisions to these embodiments once they grasp the basic creative concept. Therefore, the attached claims are to be interpreted as including the preferred embodiments as well as all modifications and revisions falling within the scope of the embodiments.

Lastly, it must also be explained that, in this document, relational terms such as "first" or "second" are used only to differentiate between one entity or operation and another entity or operation, without necessitating or implying that there is any such actual relationship or sequence between these entities or operations. Furthermore, the terms "comprise" or "contain" or any of their variants are to be taken in their non-exclusive sense. Thus, processes, methods, objects, or devices that comprise a series of elements not only comprise those elements, but also comprise other elements that have not been explicitly listed or elements that are intrinsic to such processes, methods, objects, or devices. In the absence of further limitations, for an element that is limited by the phrase "comprises a(n) . . . ", the existence of additional identical elements in processes, methods, things or devices that comprise the elements is not excluded.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive a configuration file at a device, wherein the configuration file is modifiable and extensible;
detect, with respect to the device, a data collection event, wherein the data collection event is specified by the configuration file, wherein the configuration file further specifies a set of target data information and a corresponding set of target data information providers from which to collect target data in response to the detection of the data collection event;
in response to the detection of the data collection event, collect the target data based at least in part on the set of target data information and the corresponding set of target data information providers, including to:
determine a file path associated with a target data item value corresponding to a target data item identifier included in the set of target data information;
query a target application included in the corresponding set of target data information providers for the target data item value using the file path; and
establish and store a mapping between the target data item identifier and the target data item value; and
control the device based at least in part on the collected target data; and
a memory coupled to the processor and configured to provide the processor with instructions.

2. The system of claim 1, wherein the data collection event comprises at least one of a triggering object and a triggered object, wherein the triggering object causes the data collection event to occur and wherein the triggered object is an object to which the data collection event occurs.

3. The system of claim 1, wherein to collect the target data based at least in part on the set of target data information and the corresponding set of target data information providers comprises to search for the mapping between the target data item identifier and the target data item value.

4. The system of claim 1, wherein to collect the target data based at least in part on the set of target data information and the corresponding set of target data information providers comprises to receive the target data item identifier and the target data item value via a request to a collection interface from an application.

5. The system of claim 1, wherein the processor further comprises to:
determine the target application that stores the target data item value corresponding to the target data item identifier based on the corresponding set of target data information providers; and
determine the file path corresponding to the target data item value corresponding to the target data item identifier based at least in part on a naming convention of the target application.

6. The system of claim 1, wherein to control the device based at least in part on the collected target data comprises to compare the collected target data to a control rule that prescribes an action for a given condition that is met.

7. The system of claim 6, wherein the action comprises turning on the device, turning off the device, and/or a configuring an operating parameter associated with the device.

8. The system of claim 1, wherein the collected target data comprises one or more of the following: system data, dynamic runtime data from objects in an operating system, user behavior data, data corresponding to the device, and application service data.

9. A method, comprising:
receiving a configuration file at a device, wherein the configuration file is modifiable and extensible;
detecting, with respect to the device, a data collection event, wherein the data collection event is specified by the configuration file, wherein the configuration file further specifies a set of target data information and a corresponding set of target data information providers from which to collect target data in response to the detection of the data collection event;
in response to the detection of the data collection event, collecting the target data based at least in part on the set of target data information and the corresponding set of target data information providers, including:
determining a file path associated with a target data item value corresponding to a target data item identifier included in the set of target data information;
querying a target application included in the corresponding set of target data information providers for the target data item value using the file path; and
establishing and storing a mapping between the target data item identifier and the target data item value; and
controlling the device based at least in part on the collected target data.

10. The method of claim 9, wherein the data collection event comprises at least one of a triggering object and a triggered object, wherein the triggering object causes the data collection event to occur and wherein the triggered object is an object to which the data collection event occurs.

11. The method of claim 9, wherein collecting the target data based at least in part on the set of target data information and the corresponding set of target data information providers comprises searching for the mapping between the target data item identifier and the target data item value.

12. The method of claim 9, wherein collecting the target data based at least in part on the set of target data information and the corresponding set of target data information providers comprises receiving the target data item identifier and the target data item value via a request to a collection interface from an application.

13. The method of claim 9, the method further comprising:
determining the target application that stores the target data item value corresponding to the target data item identifier based on the corresponding set of target data information providers; and
determining the file path corresponding to the target data item value corresponding to the target data item identifier based at least in part on a naming convention of the target application.

14. The method of claim 9, wherein controlling the device based at least in part on the collected target data comprises comparing the collected target data to a control rule that prescribes an action for a given condition that is met.

15. The method of claim 14, wherein the action comprises turning on the device, turning off the device, and/or a configuring an operating parameter associated with the device.

16. A computer program product, the computer program product being embodied in a non-transitory computer-readable storage medium and comprising computer instructions for:
- receiving a configuration file at a device, wherein the configuration file is modifiable and extensible;
- detecting, with respect to the device, a data collection event, wherein the data collection event is specified by the configuration file, wherein the configuration file further specifies a set of target data information and a corresponding set of target data information providers from which to collect target data in response to the detection of the data collection event;
- in response to the detection of the data collection event, collecting the target data based at least in part on the set of target data information and the corresponding set of target data information providers, including:
  - determining a file path associated with a target data item value corresponding to a target data item identifier included in the set of target data information;
  - querying a target application included in the corresponding set of target data information providers for the target data item value using the file path; and
  - establishing and storing a mapping between the target data item identifier and the target data item value; and
- controlling the device based at least in part on the collected target data.

* * * * *